United States Patent [19]
Walberg

[11] 3,731,746
[45] May 8, 1973

[54] WEIGHT TRANSFER HITCH

[75] Inventor: Maynard E. Walberg, Independence, Mo.

[73] Assignee: Allis-Chalmers Corporation, Milwaukee, Wis.

[22] Filed: Nov. 18, 1971

[21] Appl. No.: 199,943

[52] U.S. Cl..................172/9, 172/10, 91/363 A
[51] Int. Cl................................A01b 63/12
[58] Field of Search....................172/11, 2, 3, 4, 172/4.5, 6, 7–10, 12; 91/459, 363 A, 361, 390

[56] References Cited
UNITED STATES PATENTS

| 2,766,731 | 10/1956 | Brandes et al. | 91/363 A X |
| 2,887,166 | 5/1959 | Vogelaar | 172/9 |
| 2,887,167 | 5/1959 | Heitshu et al. | 172/9 |
| 2,846,635 | 8/1958 | Shea | 172/4.5 X |
| 3,016,883 | 1/1962 | Faisandier | 91/363 A |

Primary Examiner—Robert E. Pulfrey
Assistant Examiner—Stephen C. Pellegrino
Attorney—Arthur L. Nelson et al.

[57] ABSTRACT

An electrically controlled hydraulic cylinder having a variable resistor and a bridge circuit for preselecting the desired length of a remote hydraulic cylinder in the hydraulic system of a tractor.

10 Claims, 3 Drawing Figures

WEIGHT TRANSFER HITCH

This invention relates to a tractor having a hydraulic control system and more particularly to an electrical circuit having a manually controlled variable resistor in a bridge circuit for preselecting the length of the hydraulic cylinder having means for producing proportional resistance to control the length of the hydraulic cylinder in response to manually controlling the variable resistor in the bridge circuit.

A conventional weight distribution system used in conjunction with a tractor usually employs a hydraulic system to redistribute the weight on the rear wheels of the tractor in response to the draft load on the draft arms of the tractor. The draft load on the tractor is applied through a pair of draft arms, and the upper link generally controls the weight distribution on the front and rear wheels of the tractor. In this type of a hitching arrangement the upper link is under tension when the implement is raised to the transport position and under heavy draft loads such as plowing often is under compression. The lower draft arms are connected to the lift links which in turn are connected to arms on the rock shaft which pivot in response to the draft load applied to the lower draft arms. The upper draft link includes a conventional turnbuckle arrangement which provides a leveling adjustment of the implement. Although this arrangement is generally satisfactory, it does have shortcomings when the soil conditions vary and the depth of the implement must be varied to accommodate these changing soil conditions.

In the trail-behind type implement, a beaming type remote cylinder is also used to level the implement during operation. This again is usually a mechanical type arrangement in which the leveling means is mechanically set and allowed to remain in this position for some time.

Although these types of linkages are generally satisfactory, there are advantages to having an upper link of a three point hitch or a remote cylinder on the implement readily adjustable and particularly where the adjustment can be made without the operator stepping down from the operator station. Accordingly, this invention provides a hydraulic system which can be operated in conjunction with the automatic weight distribution system on a vehicle. The weight distribution on the rear wheels of the tractor are varied in response to the draft load on the lower draft arm. This portion of the hydraulic system is conventional.

The upper draft link includes a hydraulic cylinder. The hydraulic cylinder is connected through a solenoid valve to the source of pressurized fluid. The electrical circuit includes a variable resistor in a bridge circuit which can be manually controlled, and the unbalance in the system can be used to control the solenoid valve to lengthen or shorten the hydraulic cylinder in the upper link or the hydraulic cylinder which operates as the remote cylinder on the implement. This in turn will provide a leveling effect on the upper link of the three point hitch to adjust the implement in response to the manual control. Similarly, the manual control may be used to vary the length of the remote cylinder for remote adjustment of the implement. A control of this type is sensitive and provides immediate response to control the draft load on the implement. This type of a circuit would be used to override the effect of the automatic weight distribution system on a tractor. By use of the electrical circuit to control its length, any leakage in the remote hydraulic cylinder would be compensated since the leakage would shorten the cylinder and produce an unbalance in the circuit. The unbalance would immediately control the solenoid valves to lengthen the hydraulic cylinder and rectify the unbalance. Accordingly, any hydraulic cylinders can be readily lengthened or shortened, and with the electrical control any disadvantages of leakages can be immediately remedied by such a system.

It is an object of this invention to electrically control the length for a remote hydraulic cylinder in a vehicle hydraulic system.

It is another object of this invention to electrically control the length of a remote hydraulic cylinder in a tractor implement hydraulic system.

It is a further object of this invention to provide a manually controlled variable resistance in a bridge of an electrical circuit having solenoid operated valves to extend or retract a hydraulic cylinder in the hydraulic system of a tractor.

It is a further object of this invention to provide an upper link having a hydraulic cylinder which can readily be retracted or extended by a solenoid valve in response to varying a resistance in a bridge of an electrical circuit for beaming the upper link during the hitching operation of the three point hitch.

The objects of this invention are accomplished by the use of a three point hitch in which the upper links include a hydraulic actuator. The electrical control system includes a bridge circuit with a voltage applied across the bridge. A voltage sensing circuit is also connected across the bridge circuit to sense an unbalance caused by a manually controlled variable resistor. The unbalance signal is applied to a relay circuit which in turn operates solenoid valves to extend or retract the hydraulic cylinders. The extension of the hydraulic cylinder also varies a second variable resistor which rectifies the unbalance of the bridge circuit as it extends or retracts the hydraulic cylinder in response to the manual control of the first of the variable resistors. In a three point hitch having a hitch adapter for use on a category two or category three type tractor hitch, the upper link is used as a beaming cylinder to extend or retract the upper links to assist in hitching of the implement to the tractor.

The electrically controlled hydraulic cylinder may be a remote cylinder positioned on the implement. The hydraulic conduits connected to the hydraulic system on the tractor are connected for extending and retraction of the remote cylinder for leveling of the implement as desired from the operator station of the tractor.

The preferred embodiment of this invention will be illustrated and described.

Figure 1:
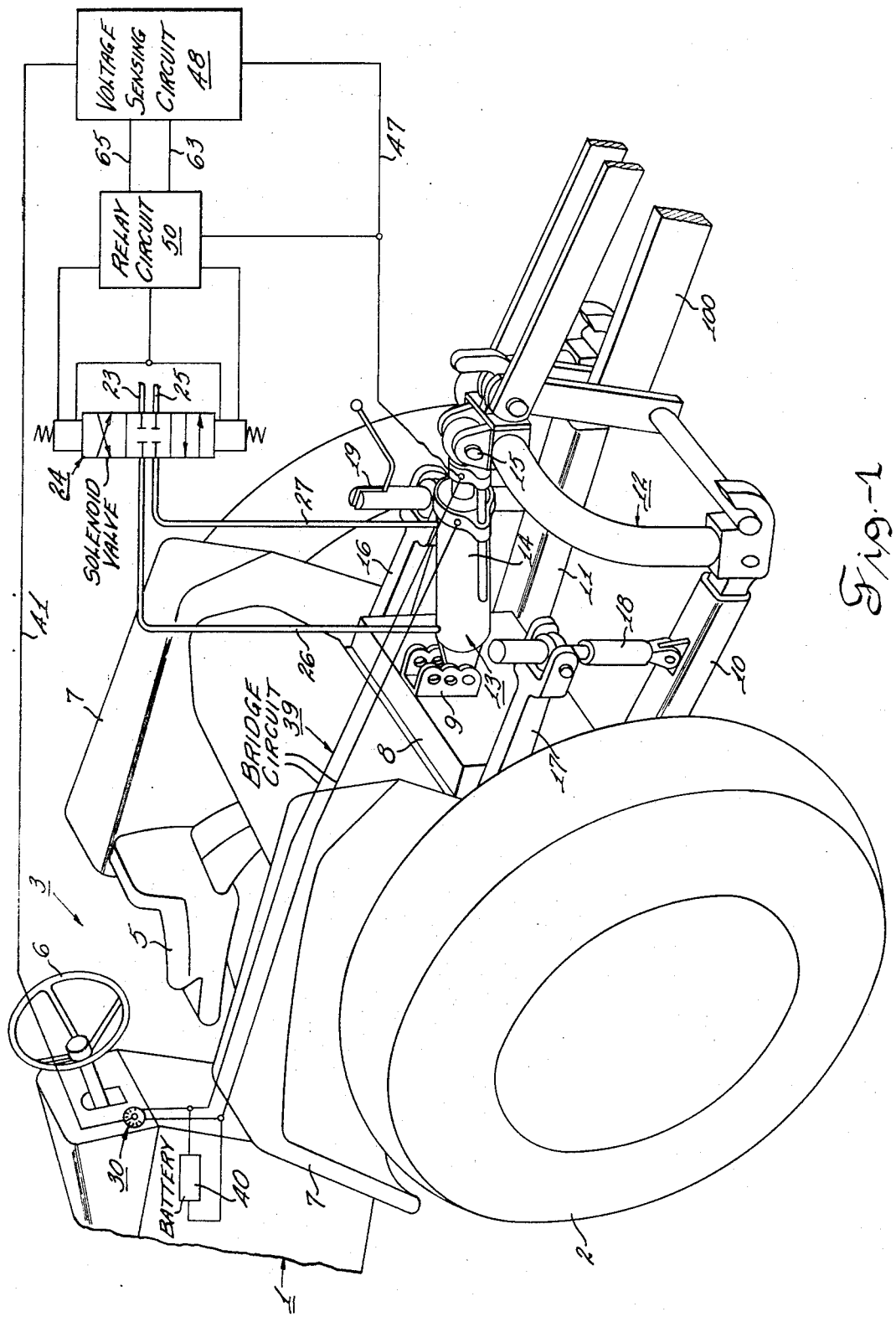
FIG. 1 illustrates a three dimensional view of a portion of the tractor and a schematic illustration of the hydraulic system and electrical system.

FIG. 1 illustrates a tractor 1 supported on wheels 2, having an operator station 3. The operator station generally is defined by the seat 5, supported on a platform, a steering wheel 6, and the fenders 7.

The housing 8 for the rear drive assembly supports the bracket 9. The lower draft arms 10 and 11 are connected to the underside of the rear drive housing 8. The lower draft arms 10 and 11 are connected to the hitch adapter 12 on the lower portion of the adapter and the upper link 13 is connected to the central upper portion of the hitch adapter 12. The upper link includes the hydraulic actuator 14 which is pivotally connected to the bracket 9 on its forward end and connected by the pin 15 on its rear end.

The rock arms 16 and 17 are connected to a rock shaft in the rear drive housing 8. The rock arms 17 and 16 are connected to the lift links 18 and 19. The lift links 18 and 19 are in turn connected to the draft arms 10 and 11 respectively. The lifting of the draft arms while an implement in operation is connected will ordinarily place more weight on the rear wheels 2 to redistribute the weight of the implement and tractor on the rear wheels to increase the tractive effort capable of the tractor. A raising of the draft arms 10 and 11 and the implement will effect a reduction in the draft load required of the tractor. This is generally controlled automatically in the response to the draft load sensing mechanism which operates the hydraulic system.

The hydraulic system includes a pump 20 having a conduit 21 receiving fluid from the sump 22. The pump 20 pressurizes hydraulic fluid in the conduit 23 which is connected to the solenoid valve 24. A return conduit 25 is connected between the solenoid valve 24 and sump 22. When the solenoid valve 24 permits pressurized fluid to flow into the conduit 26, the hydraulic cylinder 14 is lengthened and when the solenoid valve 24 permits pressurized fluid to flow through the conduit 27, the hydraulic cylinder 14 is retracted. The hydraulic cylinder 14 is a double acting cylinder and the solenoid valve returns fluid to sump 22 while supplying pressurized fluid to the cylinder 14.

Figure 3:
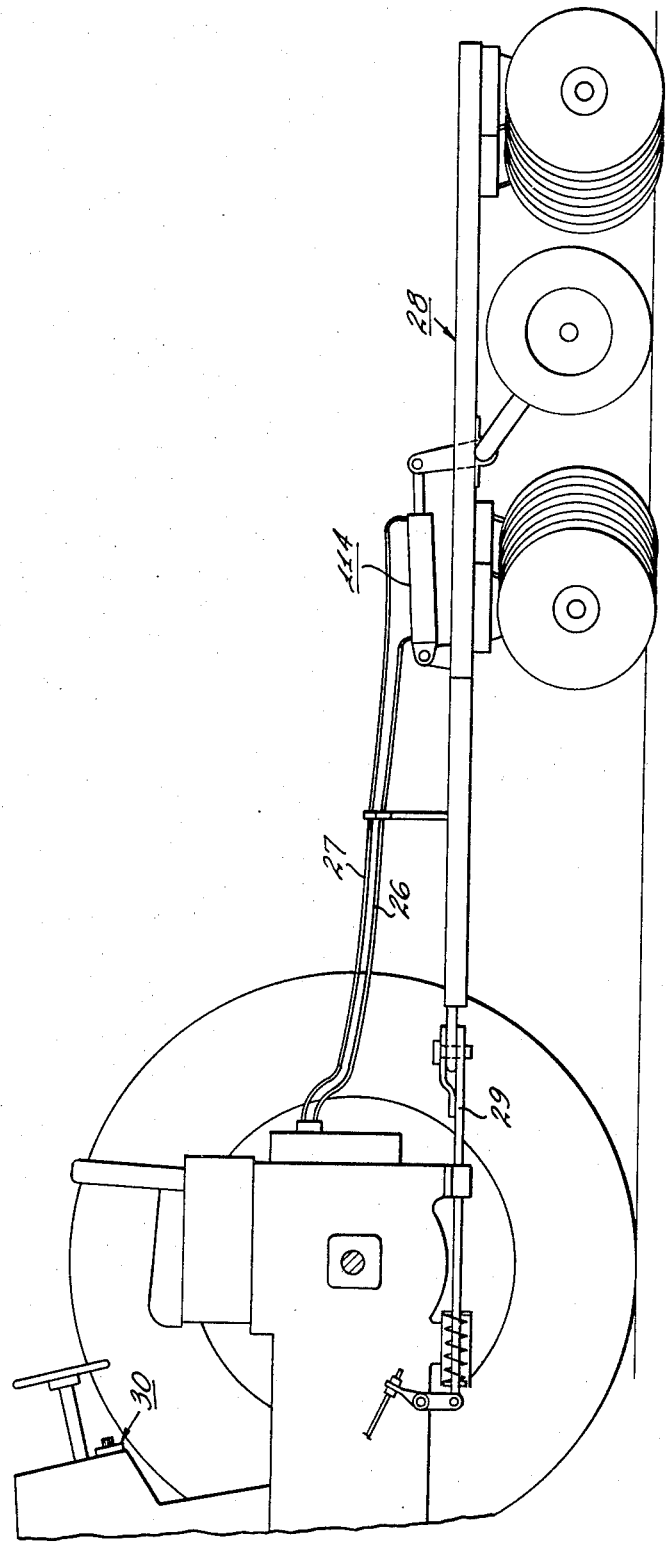
FIG. 3 illustrates the remote hydraulic cylinder on an implement hydraulically connected to the hydraulic system on a tractor.

FIG. 3 illustrates the hydraulic cylinder 114 positioned on an implement 28. The implement 28 is connected to the drawbar 29 with the conduits 26 and 27 connected to extend or retract the hydraulic cylinder 114. The control 30 is positioned at the operator station for the convenience of the operator.

Figure 2:
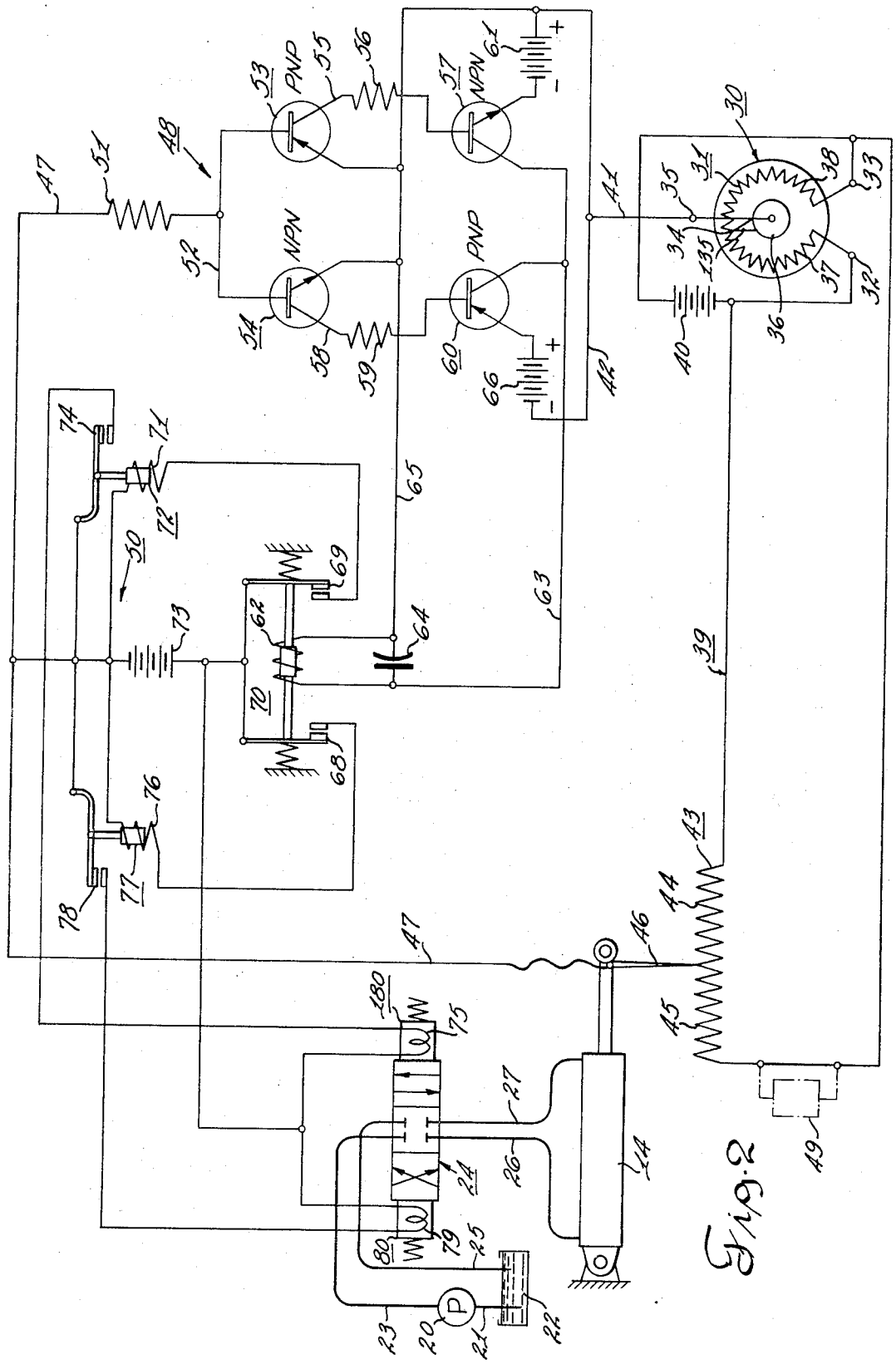
FIG. 2 illustrates the electrical system and its connection to the hydraulic cylinder.

The control 30 is also shown in the electrical circuit, as shown in FIG. 2. The control 30 consists essentially of a rheostat having a resistor 31 connected between the terminal 32 and 33. The contact 34 is connected to the terminal 35 which engages the resistor 31. As the knob 36 rotates the pointer 135 across the dial, the contact 34 sweeps across the resistor 31 varying the resistance of the leg 37 with respect to the resistance in the leg 38 of the resistor 31. The leg 37 and 38 form two legs of the bridge circuit 39. The battery 40 is connected to the terminals 32 and 33 while the terminal 35 is connected through the conductor 41 to the conductor 42. The resistance 43 forms the legs 44 and 45. The contact 46 is connected to the conductor 47 of the voltage sensing circuit 48. Accordingly, it can be seen that the legs 37 and 38 are connected in series across from battery 40 and in parallel with the two legs 44 and 45 of the bridge circuit 39. Although a variation of the resistance in leg 38 also varies the resistance in leg 37 and a variation of resistance of leg 45 also varies the resistance of leg 44, it is understood that a variable resistor in two of the parallel legs would operate in the bridge circuit.

An optional circuit includes a pressure sensitive transducer 49. The pressure sensitive transducer is positioned between the bracket 9 and the rear drive housing 8. As the compression and tension of the upper link 13 varies, the voltage across the pressure sensitive transducer 49 will vary the resistance in the leg 45. With an increase in draft load, the compression on the upper link 13 would increase which in turn would reduce the resistance of the pressure sensitive transducer 49 and set up an unbalance in the bridge circuit 39. This would be rectified through the transistorized voltage sensing circuit 48 which senses the unbalance signal and operates the relays in the relay circuit 50 and the solenoids on the solenoid valve 24. The voltage sensing circuit 48 is connected to the center tap 46 of resistor 43 through the conductor 47. The resistor 51 is connected between conductor 47 and the electrical conductor 52. The electrical conductor 52 is connected to the base of each of the transistors 53 and 54. The collector of transistor 53 is connected through the conductor 55 and resistor 56 to the base of the transistor 57. The collector of the transistor 54 is connected through the electrical conductor 58 and resistor 59 to the base of transistor 60. Transistor 53 is a PNP transistor, while transistor 54 is a NPN transistor. Consequently, a variation of the voltage applied to the base of these two transistors will cause the one or the other to conduct.

The battery 61 has the negative terminal connected to the emitter of the transistor 57. The collector of the transistor 57 is connected to the relay coil 62 through conductor 63. The capacitor 64 is connected across the relay coil 62. A conductor 65 connects the opposite side of the relay coil 62 to the positive terminal of the battery 61. The electrical conductor 65 is also connected to the emitter of the transistor 54. Battery 66 has its negative terminal connected through conductor 42 to conductor 41 and is also connected to the positive terminal of battery 61 and the emitter of transistor 53. As previously pointed out, the electrical conductor 65 is connected through the relay coil 62 to conductor 63 which in turn is connected to the collectors of transistors 60 and 57. The emitter of the transistor 60 is connected to the positive terminal of the battery 66.

The relay coil 62 operates the contacts 68 and 69 of the relay 70. The direction of the current in the relay 62 determines which of the contacts 68 or 69 are actuated. Closing contact 69 energizes relay coil 71 of relay 72 since battery 73 is connected across the relay coil 71. Relay coil 71 operates the contacts 74 which energize the solenoid coil 75 of solenoid 180 which in turn is then connected across the battery 73.

A reversal of the current through relay coil 62 will actuate contact 68 and cause current to flow through the relay coil 76 of relay 77. Energization of relay coil 76 closes the contact 78 which places the solenoid coil 79 of solenoid 80 across the battery 73.

Solenoid valve 24 is a three way valve whereby pressurized fluid is permitted to flow into one chamber of the hydraulic cylinder 14 while the fluid returns from the hydraulic cylinder 14 to sump and actuation of the other coil provides a reversal of the fluid flow into the opposite chamber while the fluid in the other chamber returns to sump as well as the neutral position.

The operation of this invention will be described in the following paragraphs.

When the tractor 1 is in operation and an implement 100 is connected to the lower draft arms 10 and 11, the implement will cause varying pressure in the upper draft link 13 responsive to the draft load on the lower draft arm. With a heavy draft load on the tractor, the upper draft link 13 is in compression. In accordance with the conventional weight distribution system which operates automatically the draft load sensing mechanism is used to sense the draft load. At a predetermined draft load the sensor will cause hydraulic cylinders to operate the rock arms which will in turn cause the lifting of the draft arms 10 and 11 through the lift links 18 and 19 on the rock arms 17 and 16. A decrease in the draft load will produce the reversal of this operation to increase the working depth of the implement.

The hydraulic system as illustrated in this application overrides the automatic system and can be operated manually by the operator at the operator station. When it is desired to extend the hydraulic cylinder 14, the knob 36 of the control 30 is rotated in the clockwise direction shortening leg 38 relative to leg 37 of resistor 31 and producing an unbalance in the bridge circuit 39. This causes the contact 46 on the resistor 43 to be more negative than the point of contact 34 on resistor 31. The negative bias is placed on the base transistors 53 and 54 through the resistor 51. A negative bias on transistor 53 will cause the transistor 53 to conduct producing a positive bias on the base of transistor 57. This in turn causes transistor 57 to conduct and the electron current flows through the transistor 57 and the relay coil 62 to the positive side of the battery 61. Current flowing through the coil 62 actuates relay 70.

When the electron current flows through relay coil 62 from left to right, the contacts 68 of relay 70 are actuated causing the current from battery 73 to flow through the relay coil 76 and closing the contact 78 of relay 77. This in turn causes the current from battery 73 to flow through the relay coil 79 of solenoid 80 moving the solenoid in a left hand direction and causing pressurized fluid to flow through the conduit 23 and conduit 26 to extend the hydraulic cylinder 14. Hydraulic fluid from the hydraulic cylinder 14 is returned through conduits 27 and 25 to sump 22.

When the electrical potential on conductor 47 and conductor 41 are equalized due to the movement of the contact 46 on resistor 43, the unbalance in the bridge circuit is overcome and the transistor sensing circuit 48 is no longer conducting current through the relay 62. With a balanced condition in the bridge circuit and current no longer flowing through relay coil 62, the relay contacts 68 and 78 open. The solenoid valve 24 closes and the hydraulic cylinder 14 is maintained at this length.

When it is desired to shorten the hydraulic cylinder 14, the control 30 is rotated in a counterclockwise direction causing the pointer 135 to move counterclockwise and producing a more positive potential on contact 46 of resistor 43 than the potential of the contact 34 on resistor 31. With the positive potential on the contact 46, this potential is applied to the base of transistors 53 and 54. Transistor 54 is a NPN transistor, and consequently, with a positive bias applied to the base of the transistor 54, the transistor conducts electron current through the transistor to the base of transistor 60. With an increase in negative bias on the base of transistor 60, electron current flows from the negative terminal of battery 66 through the conductor 65 and the relay coil 62 from right to left and then through the transistor 60 to the positive side of the battery. The relay coil 62 causes the contacts 69 to close. With contacts 69 closed, the battery current of battery 73 flows through the coil 71 closing the contacts 74 producing a current flow from battery 73 through the solenoid coil 75 of solenoid 180. With the current flowing through solenoid coil 75, the valve is moved in the right hand direction and the pressurized fluid in conduit 23 flows through conduit 27 while the hydraulic fluid flows out of the hydraulic cylinder 14 through conduit 26 to conduit 25 to sump 22. This in turn contracts the hydraulic cylinder 14 and shortens leg 44 and balances the bridge circuit 39.

When the pressure sensitive transducer 49 is positioned in the circuit, as shown as a modification of the bridge circuit, the upper link 13 will produce varying pressure on the transducer with a heavy draft load on the tractor. As the pressure on the transducer 49 increases, the resistance of the pressure sensitive transducer 49 decreases. This in turn will cause the contact 46 to be more positive than the contact 34 and place a positive bias on the bases of transistors 53 and 54. With the positive bias on the base of transistor 54, transistor 54 conducts and places a negative bias on the base of transistor 57 which causes transistor 57 to conduct. With transistor 57 conducting the electron current flows from right to left through the relay coil 62 which in turn causes the contact 69 of relay 70 to close. This in turn causes current flow through relay coil 71 of relay 72 to close contact 74. With contact 74 closed, current flows through solenoid coil 75 of solenoid 180 which causes hydraulic fluid to flow through conduit 23 and 27 to retract the hydraulic cylinder 14 while the hydraulic fluid flows out of conduit 26 and 25 to sump 22. The pressure on transducer 49 decreases and its resistance increases thereby balancing the bridge circuit 39. In this manner, the hydraulic control can be provided to automatically control leveling of the implement when used with a three point hitch of the tractor.

FIG. 3 illustrates a modification where the use of a remote cylinder is placed on an implement. The operation of the remote cylinder is similar to that described above, although its use is not the same as that shown in the three point hitch. When a transducer is used in the circuit and pressure on the transducer increases, the resistance of the transducer will decrease. This in turn will cause the pointer 46 to be more positive than the contact 34 and produce a positive bias supplied to the transistor 54. With a positive bias on transistor 54, transistor 54 conducts and places a negative bias on the transistor 60 which causes transistor 60 to conduct. With transistor 60 conducting the current flows from right to left through the relay coil 62 which in turn causes the contact 69 of relay 70 to close. This in turn causes current flow through relay coil 71 of relay 72 and contact 74 to close. With contact 74 closed, current flows through solenoid coil 75 of solenoid 180 which causes hydraulic fluid to flow through conduit 23 and 27 to retract the hydraulic cylinder 14 while the hydraulic fluid flows out of conduit 26 and 25 to sump 22. In this manner, the hydraulic control can be provided to automatically control implement depth of a trail-behind implement.

FIG. 3 illustrates a modification where the use of a remote cylinder is placed on an implement. The operation of the remote cylinder without the transducer is the same as described above for remote manual extension and retraction.

The embodiments of the invention in which an exclusive property or privilege is claimed are defined as follows:

1. In a tractor having a hitch and an implement connected thereto, a hydraulic system for controlling the position of said implement comprising, a hydraulic actuator connected to said hitch, an electrical system on said tractor including a bridge circuit having four resistance legs, a source of electrical energy connected across said bridge circuit, a manually controlled variable resistance forming one of said legs, a hydraulically controlled variable resistance forming another of said legs of said bridge circuit, a hydraulic actuator connected to the hydraulically controlled variable resistance of said other leg of said bridge circuit, a source of pressurized fluid, a solenoid valve hydraulically connected between said hydraulic actuator and said source of pressurized fluid, a voltage sensing circuit connected to said bridge for sensing an unbalanced voltage produced in said bridge circuit, a solenoid valve operating circuit connected to said solenoid valve and said voltage sensing circuit to thereby provide means for varying the resistance in said bridge circuit and produce a voltage signal for operating said solenoid valve to hydraulically adjust the length of said hydraulic actuator.

2. A control system as set forth in claim 1 wherein said voltage sensing circuit includes transistors conducting current in response to the unbalanced voltage sensed, a relay circuit connected to said voltage sensing circuit to operate said solenoid valve.

3. A control system as set forth in claim 1 wherein said solenoid valve includes means providing three positions of said solenoid valve for transmitting hydraulic fluid to and from said hydraulic actuator for extending and retracting said actuator, means in said solenoid valve to lock hydraulic fluid in said hydraulic actuator to retain a predetermined length of said hydraulic actuator when said solenoid valve is closed.

4. A control system as set forth in claim 1 wherein said bridge circuit includes a Wheatstone bridge, a battery connected across said Wheatstone bridge, said voltage sensing circuit including means connected between the two resistance legs on each side of said bridge circuit to sense a voltage unbalance in said circuit.

5. A control system as set forth in claim 1 wherein said bridge circuit includes a pair of resistors connected in series forming one side of the bridge, a pair of resistors connected in series forming the other side of said bridge, a battery connected across both of said pairs of resistors, a pressure sensitive transducer connected in series with one of said resistors forming one leg of said bridge circuit, said transducer thereby varying the voltage across one pair of said resistors to produce an unbalance in said bridge circuit in response to pressure on said transducer.

6. A control system as set forth in claim 1 including means on said implement connected to said hydraulic actuator for controlling operation of said implement in response to a change in said manually controlled resistance.

7. A control system as set forth in claim 1 wherein said hitch is a three point hitch, the upper link of which includes said hydraulic actuator for thereby providing an implement leveling means.

8. A control system as set forth in claim 1 including means defining an operator station on said tractor, means for supporting said manually controlled resistance at said operator station.

9. A control system as set forth in claim 1 wherein said bridge circuit includes, a rheostat defining a first and second resistance legs and having a center tap on said rheostat connected to said voltage sensing circuit and manual control means, a resistor defining the third and fourth resistance legs and having a center tap connected to said hydraulic actuator and said voltage sensing circuit, said manual control means thereby providing a means for varying the position of said center tap on said rheostat and the length of said hydraulic actuator.

10. A control system as set forth in claim 1 wherein said bridge circuit includes a variable resistor having a center tap with one end connected to said source of electrical energy, a transducer connected between the other end of said resistor and said source of electrical energy, a rheostat having two terminals connected across said battery and a center tap, said voltage sensing circuit including means connected to the center taps of said rheostat and said variable resistor to provide a voltage sensing circuit on said bridge circuit.

* * * * *